United States Patent
Lee et al.

(10) Patent No.: US 7,855,771 B2
(45) Date of Patent: Dec. 21, 2010

(54) LIQUID CRYSTAL DISPLAY PANEL AND ACTIVE MATRIX SUBSTRATE THEREOF

(75) Inventors: Chien-Chung Lee, Tainan County (TW); Fa-Chen Wu, Taichung (TW)

(73) Assignee: Wintek Corporation, Taichung (TW)

( * ) Notice: Subject to any disclaimer, the term of this patent is extended or adjusted under 35 U.S.C. 154(b) by 358 days.

(21) Appl. No.: 12/061,653

(22) Filed: Apr. 3, 2008

(65) Prior Publication Data
US 2008/0246898 A1    Oct. 9, 2008

(30) Foreign Application Priority Data
Apr. 4, 2007    (TW) .............................. 96111999 A

(51) Int. Cl.
*G02F 1/1343* (2006.01)
(52) U.S. Cl. ........................................ 349/143; 349/37
(58) Field of Classification Search ................ 349/41, 349/43, 37, 139, 143, 106, 113, 114
See application file for complete search history.

(56) References Cited
U.S. PATENT DOCUMENTS
6,014,190 A * 1/2000 Kim et al. ..................... 349/39

| 6,822,724 B2 | 11/2004 | Ogishima et al. |
| 6,839,104 B2 | 1/2005 | Taniguchi et al. |
| 2004/0041770 A1 | 3/2004 | Kubo et al. |

\* cited by examiner

*Primary Examiner*—Thoi V Duong
(74) *Attorney, Agent, or Firm*—Jianq Chyun IP Office

(57) ABSTRACT

An active matrix substrate is provided. The active matrix substrate includes a substrate, scan lines, data lines, pixel units, and connecting lines. The scan lines, data lines, pixel units, and connecting lines are all disposed over the substrate. The pixel unit includes an active component, a first pixel electrode, a second pixel electrode, and a third pixel electrode. The active components are electrically connected with the scan lines and data lines. The first pixel electrode and the second pixel electrode are disposed at the two opposite sides of the scan line, and electrically connected with the active component. The third pixel electrode is electrically insulated from the active component. In the pixel units arranged in a same column, each of the third pixel electrodes is electrically connected with the second pixel electrode controlled by a previous scan line through the corresponding connecting line.

19 Claims, 7 Drawing Sheets

LIQUID CRYSTAL DISPLAY PANEL AND ACTIVE MATRIX SUBSTRATE THEREOF

CROSS-REFERENCE TO RELATED APPLICATION

This application claims the priority benefit of Taiwan application serial no. 96111999, filed on Apr. 4, 2007. The entirety the above-mentioned patent application is hereby incorporated by reference herein and made a part of specification.

BACKGROUND OF THE INVENTION

1. Field of the Invention

The present invention is related to a liquid crystal display panel and an active matrix substrate, and more particularly to a liquid crystal display panel with wide viewing angle and an active matrix substrate thereof.

2. Description of Related Art

Nowadays, the functions that the market demands of the thin film transistor liquid crystal display (TFT-LCD) tend to be high contrast ratio, high luminance, quick response and wide viewing angle. Currently, the technologies that meet the requirement of wide viewing angle include, for example, the twisted nematic (TN) LCD with a wide viewing film, the in-plane switching (IPS) LCD, the fringe field switching (FFS) LCD and the multi-domain vertical alignment (MVA) TFT-LCD.

In the conventional MVA-LCD panel, since alignment protrusions or slits formed on the color filter substrate or the TFT array substrate can render liquid crystal molecules arranged in multiple directions, thereby achieving multi-domain. Therefore, the MVA-LCD panel can meet the requirement of wide viewing angle.

Although the conventional MVA-LCD panel meets the requirement of wide viewing angle, it has the problem of color shift. The so-called color shift means users would see an image having gray scales different from the original image when viewing images on the display device from different viewing angles. For example, users would see an image lighter than the original image if viewing from a large angle. The problem of color shift would deteriorate the display quality of the image. Solutions have been proposed to solve this problem so far. One of the solutions is forming an additional capacitor in a single pixel unit. The capacitor makes the pixel electrodes in the single pixel unit generate electric fields of different intensities by electrical coupling, thereby generating different arrangements of liquid crystal molecules. Although the method can mitigate the phenomenon of color shift, it tends to result in the resistance-capacitance (RC) delay effect and thus causing distorted display images and poor display quality. Another method is adding one more transistor in a single pixel unit. In other words, a single pixel unit has two transistors. The two transistors make the pixel electrodes in the single pixel unit generate different electric fields and thus generating different arrangements of liquid crystal molecules so as to eliminate color shift. However, the method requires forming two transistors within a single pixel unit and adding lines (such as scan lines) so that the fabrication process is complicated and the fabrication cost is higher as well.

SUMMARY OF THE INVENTION

The present invention provides an active matrix substrate to improve the display quality of a liquid crystal display (LCD) device.

The invention also provides an LCD panel including the active matrix substrate and having a characteristic of wide viewing angle.

The invention further provides an active matrix substrate to mitigate the problem of color shift.

The invention further provides an LCD panel including the active matrix substrate so as to mitigate the problem of color shift.

As broadly embodied and described herein/ In order to achieve the aforementioned and other objects, the invention provides an active matrix substrate including a substrate, a plurality of scan lines and data lines, a plurality of pixel units and a plurality of connecting lines. The scan lines, the data lines, the pixel units and the connecting lines are all disposed on the substrate. Each of the pixel units includes an active component, a first pixel electrode, a second pixel electrode and a third pixel electrode. The active components are electrically connected to the scan lines and the data lines. The first and the second pixel electrodes are respectively disposed at the two opposite sides of the scan line and electrically connected with the active component. The third pixel electrode is disposed over the active component and electrically insulated from the active component. Pixel units arranged in the same column, each of the third pixel electrodes is electrically connected to the second pixel electrode controlled by a previous scan line through the corresponding connecting line. Each of the first pixel electrodes is surrounded by two connecting lines, a second pixel electrode and a third pixel electrode, and each of the third pixel electrodes is located between a second pixel electrode and a first pixel electrode.

According to one embodiment of the present invention, in the same pixel unit, the voltage polarity of the first pixel electrode is the same as that of the second pixel electrode. The voltage polarity of the third pixel electrode is contrary to that of the first pixel electrode.

According to one embodiment of the invention, the plurality of first pixel electrodes, the plurality of second pixel electrodes, the plurality of third pixel electrodes and the plurality of connecting lines belong to the same layer of electrode patterns.

According to one embodiment of the invention, in each of the pixel units, a total area of the first and the second pixel electrodes is substantially equal to that of the third pixel electrode.

According to one embodiment of the invention, in each of the pixel units, a total area of the first and the second pixel electrodes is larger than that of the third pixel electrode.

According to one embodiment of the invention, the active matrix substrate further includes a plurality of reflective layers disposed on the third pixel electrode correspondingly.

According to one embodiment of the invention, in each of the pixel units, a total area of the first and the second pixel electrodes is different from that of the third pixel electrode.

According to one embodiment of the invention, in each of the pixel units, a total area of the first and the second pixel electrodes is substantially equal to that of the third pixel electrode.

According to one embodiment of the invention, the active component includes an amorphous silicon thin film transistor (a-Si TFT) or a poly-silicon TFT.

The invention further provides an LCD panel including the above-mentioned active matrix substrate, an opposite substrate and a liquid crystal layer. The opposite substrate is located on the active matrix substrate. The liquid crystal layer is disposed between the active matrix substrate and the opposite substrate.

According to one embodiment of the invention, in each of the pixel units, a distance between the opposite substrate and the first pixel electrode is a first distance. A distance between the opposite substrate and the second pixel electrode is a second distance. The first distance is two times of the second distance.

The invention further provides an active matrix substrate including a substrate, a plurality of scan lines, a plurality of data lines, a plurality of pixel units and a plurality of conductive patterns. The plurality of scan lines and data lines and the plurality of pixel units and conductive patterns are all disposed on the substrate. The plurality of pixel units are electrically connected to the scan lines and data lines correspondingly. Each of the pixel units includes an active component and a pixel electrode. The active components are electrically connected with the scan lines and the data lines. The pixel electrode is electrically connected to the active component and has a first electrode portion over the active component and a second electrode portion electrically connected to the first electrode portion. A slit exists between the second electrode portion and the first electrode portion. Each of the conductive patterns has a body portion and an extending portion. Each of the body portions is located on one of the first electrode portions and electrically connected to one of the first electrode portions respectively. The extending portions extend from the body portions towards the direction of the pixel electrode controlled by the next scan line into the corresponding slit. Each of the conductive patterns is electrically insulated from the pixel electrode controlled by a next scan line. Each of the second electrode portions is located between two adjacent body portions and between two adjacent extending portions.

According to one embodiment of the invention, in the pixel electrodes arranged in the same column, the voltage polarity of each of the pixel electrodes is contrary to those of the pixels electrodes controlled by a previous and a next scan lines.

According to one embodiment of the invention, the plurality of body portions and the extending portions belong to the same layer of conductive patterns.

According to one embodiment of the invention, the first electrode portion and the second electrode portion belong to the same layer of electrode patterns.

According to one embodiment of the invention, in each of the pixel units, an area of the first electrode portion is different from that of the second electrode portion.

According to one embodiment of the invention, in each of the pixel units, an area of the first electrode portion is substantially equal to that of the second electrode portion.

According to one embodiment of the invention, the active component includes an A-Si TFT or a poly-silicon TFT.

The present invention further provides an LCD panel including the above-mentioned active matrix substrate, an opposite substrate and a liquid crystal layer. The opposite substrate is located on the active matrix substrate. The liquid crystal layer is disposed between the active matrix substrate and the opposite substrate.

The liquid crystal molecules within the same pixel unit are arranged as multi-domain on pixel electrodes with different voltages resulted from the connecting lines or the conductive patterns of the active matrix substrate. Thus, the LCD panel of the invention has the characteristic of wide viewing angle, and the problem of color shift is also mitigated. In addition, since no additional active component or line is required for each of the pixel units, the invention has the advantages of a simple fabricating process and a low fabricating cost as compared with the prior art.

In order to the make the aforementioned and other objects, features and advantages of the present invention more comprehensible, preferred embodiments accompanied with figures are described in detail below.

DESCRIPTION OF EMBODIMENTS

The First Embodiment

Figure 1A:
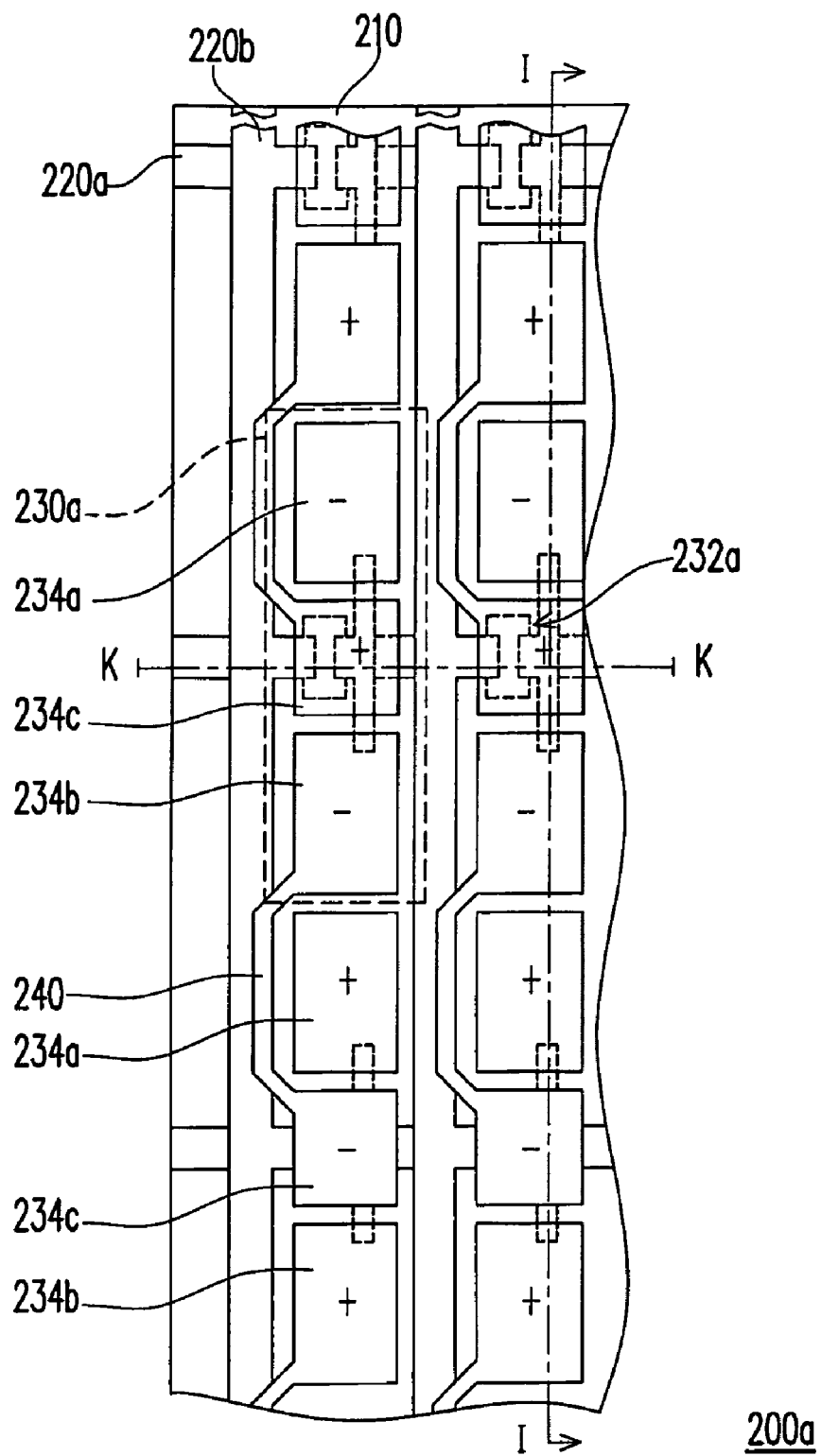
FIG. 1A illustrates a schematic top view of the active matrix substrate according to the first embodiment of the present invention.
Figure 1B:
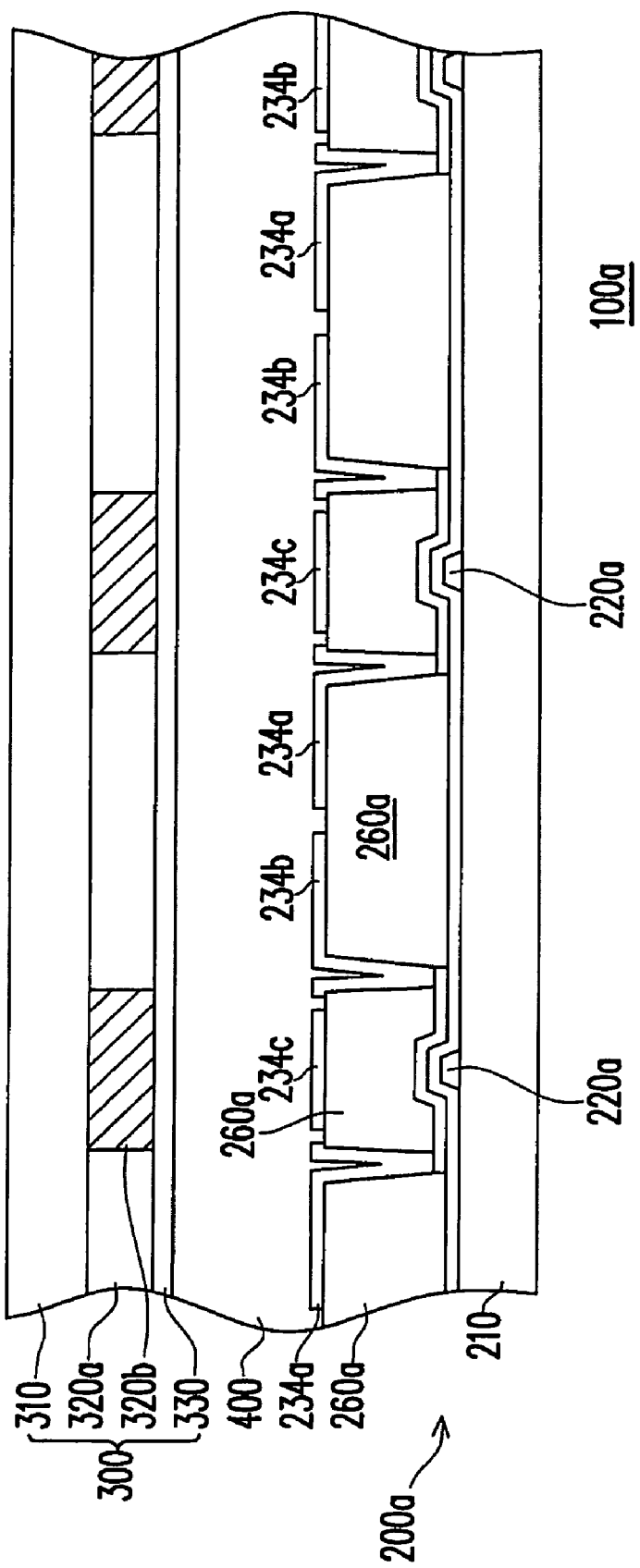
FIG. 1B illustrates a schematic cross-sectional view of the LCD panel according to the first embodiment of the invention.
Figure 1C:
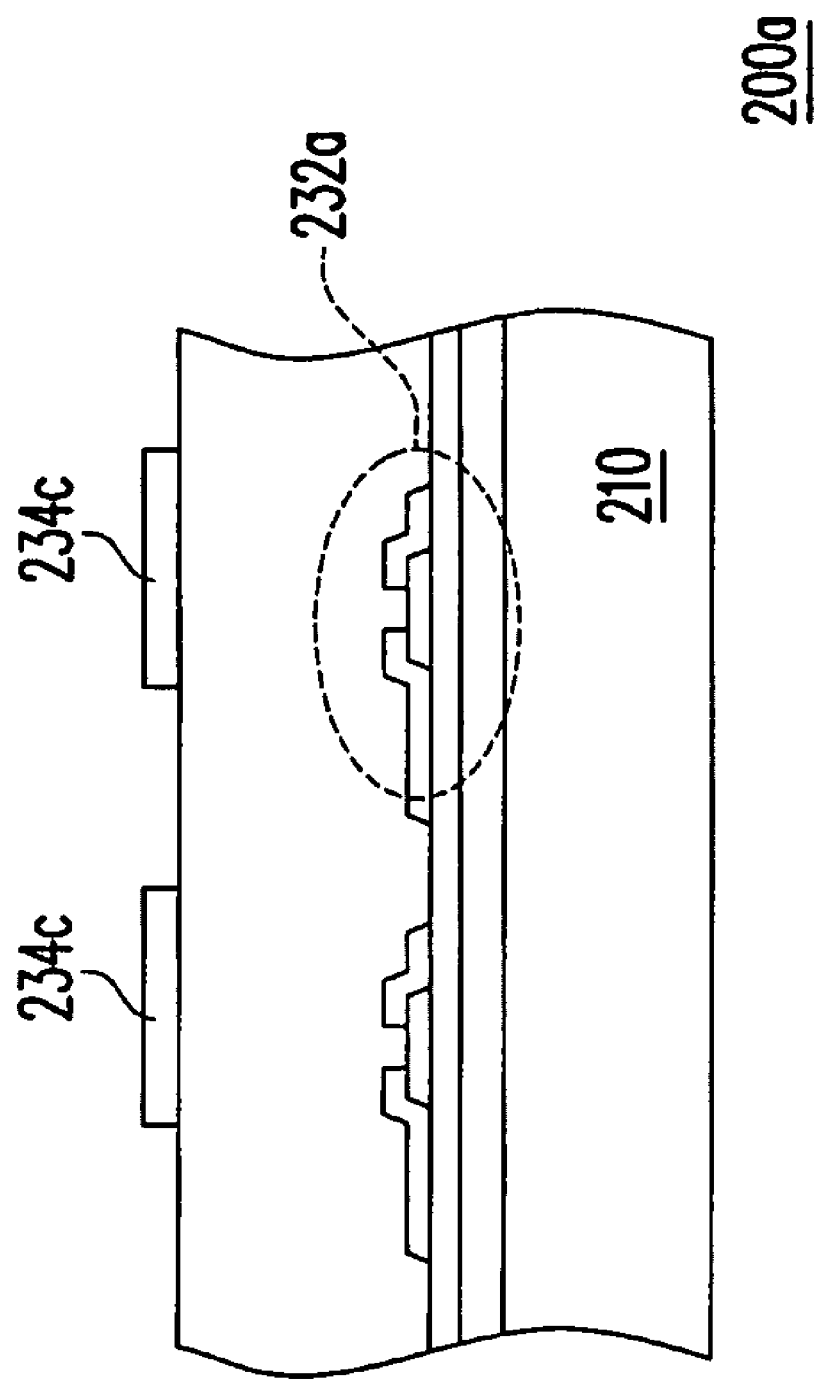
FIG. 1C illustrates a cross-sectional view of FIG. 1A along line K-K.

FIG. 1A illustrates a schematic top view of the active matrix substrate according to the first embodiment of the invention. FIG. 1B illustrates a schematic cross-sectional view of the liquid crystal display (LCD) panel of the first embodiment of the invention, and an active matrix substrate 200a shown in FIG. 1B is a cross-sectional view obtained from FIG. 1A along line I-I. FIG. 1C illustrates a cross-sectional view of FIG. 1A along line K-K. Referring to both FIGS. 1A to 1C, an LCD panel 100a of the present embodiment includes an active matrix substrate 200a, an opposite substrate 300 and a liquid crystal layer 400. The opposite substrate 300 is disposed above the active matrix substrate 200a, and the liquid crystal layer 400 is disposed between the active matrix substrate 200a and the opposite substrate 300, as shown in FIG. 1B.

The active matrix substrate 200a includes a substrate 210, a plurality of scan lines 220a, a plurality of data lines 220b, a plurality of pixel units 230a and a plurality of connecting lines 240. The scan lines 220a, the data lines 220b, the pixel units 230a and the connecting lines 240 are all disposed over the substrate 210. Each of the pixel units 230a includes an active component 232a, a first pixel electrode 234a, a second pixel electrode 234b and a third pixel electrode 234c. The active component 232a is electrically connected to one of the scan lines 220a and one of the data lines 220b correspondingly, and the active component 232a is, for example, an a-Si TFT or a poly-silicon TFT. The first pixel electrode 234a and the second pixel electrode 234b are disposed respectively at the two opposite sides of the scan line 220a and electrically connected with the active component 232a. Thus, the active component 232a controls the first pixel electrode 234a and the second pixel electrode 234b. The third pixel electrode 234c is disposed over the active component 232a and electrically insulated from the active component 232a. Each of the first pixel electrodes 234a is surrounded by two connecting lines 240, a second pixel electrode 234b and a third pixel electrode 234c. Each of the third pixel electrodes 234c is located between one of the second pixel electrodes 234b and one of the first pixel electrodes 234a.

In the pixel units 230a arranged in the same column, each of the third pixel electrodes 234c is electrically connected to one of the second pixel electrodes 234b controlled by a previous scan line 220a through one of the connecting lines 240 correspondingly. Therefore, the third pixel electrode 234c is controlled by the active component 232a electrically connected with the previous scan line 220a. In addition, the first pixel electrode 234a, the second pixel electrode 234b, the third pixel electrode 234c and the connecting line 240 may be fabricated using transparent conductive materials, such as indium tin oxide (ITO), indium zinc oxide (IZO), or other transparent conductive oxide.

Moreover, the active matrix substrate 200a further includes a planarization layer 260a as shown in FIG. 1B. In one preferred embodiment, the thickness of the planarization layer 260a is about 2-3 micrometers (μm). A plurality of first pixel electrodes 234a, second pixel electrodes 234b and third pixel electrodes 234c are disposed on the planarization layer 260a. The planarization layer 260a is disposed on the substrate 210 to cover a plurality of scan lines 220a and data lines 220b and a plurality of active components 232a so as to avoid parasitic capacitance. In the present embodiment, the material of the planarization layer 260a is organic dielectric material, for example.

The LCD panel 100a is driven, for example, by the line inversion driving technique. Hence, the voltage polarity of the first pixel electrode 234a in the pixel unit 230a is contrary to the voltage polarity of the first pixel electrode 234a controlled by a previous and a next scan lines 220a; and the voltage polarity of the second pixel electrode 234b in the pixel unit 230a is contrary to the voltage polarity of the second pixel electrode 234b controlled by a previous and a next scan lines 220a. Besides, in the same pixel unit 230a, the connecting line 240 is located next to the first pixel electrode 234a so as to electrically connect the third pixel electrode 234c and a previous second pixel electrode 234b. Therefore, the voltages of the connecting line 240 and the third pixel electrode 234c are the same. In each pixel unit 230a, the voltage polarity of the first pixel electrode 234a and the second pixel electrode 234b is contrary to the voltage polarity of the connecting line 240 and the third pixel electrode 234c.

Each of the first pixel electrodes 234a is surrounded by the second pixel electrode 234b having a contrary voltage polarity and controlled by a previous scan line 220a, the third pixel electrode 234c and the connecting line 240. Hence, the liquid crystal molecules in a single pixel unit 230a would form multiple domains on the first pixel electrode 234a. In the pixel units 230a of the same column, each of the second pixel electrodes 234b is disposed between the third pixel electrode 234c having a contrary voltage polarity and the first pixel electrode 234a controlled by the next scan line 220a. Each of the third pixel electrodes 234c is disposed between the first pixel electrode 234a and the second pixel electrode 234b. Thus, the crystal liquid molecules in the single pixel unit 230a would also form multiple domains on the second pixel electrode 234b and the third pixel electrode 234c. It is known from the above-mentioned that the multiple domains are formed on the first pixel electrode 234a, the second pixel electrode 234b and the third pixel electrode 234c respectively. With the multiple domains of the liquid crystal molecules in each of the pixel units 230a, the LCD panel 100a can achieve the characteristic of wide viewing angle.

Furthermore, since distributions of the electric fields over the first pixel electrode 234a, the second pixel electrode 234b and the third pixel electrode 234c vary, in each of the multiple domains, the relation between electric field distribution and luminance variation also differs accordingly and thereby mitigating the problem of color shift.

In the present embodiment, the first pixel electrode 234a, the second pixel electrode 234b, the third pixel electrode 234c and the connecting line 240 belong to the same layer of electrode patterns. Thus, the first pixel electrode 234a, the second pixel electrode 234b, the third pixel electrode 234c and the connecting line 240 on the active matrix substrate 200a can be fabricated by the same fabricating process. According to the foregoing, not only the fabricating process is simplified in the embodiment, but the fabricating time is shortened.

Additionally, in order to meet the demands of different products, in each of the pixel units 230a, a total area of the first pixel electrode 234a and the second pixel electrode 234b may be substantially equal to or larger than an area of the third pixel electrode 234c.

Referring to FIG. 1B, the opposite substrate 300 of the present embodiment may be a color filter substrate including a substrate 310, a plurality of color filter patterns 320a, a black matrix (BM) layer 320b and a common electrode 330. The plurality of color filter patterns 320a and the BM layer 320b are disposed on the substrate 310. The common electrode 330 is disposed on the color filter patterns 320a and the BM layer 320b. The plurality of color filter patterns 320a includes a plurality of red filter patterns, green filter patterns and blue filter patterns. Moreover, the color filter patterns 320a may be fabricated using resin materials.

The BM layer 320b is located among the plurality of filter patterns 320a. In the present embodiment, the LCD panel 100a may be a transmissive LCD. The BM layer 320b is suitable for covering the scan lines 220a, the data lines 220b and the active components 232a on the active matrix substrate 200a so as to prevent the display quality of the LCD panel 100a from being affected. However, a reflective layer can be added over the active component 232a of the active matrix substrate 200a to replace a portion of the BM layer 320b disposed over the corresponding active component 232a or a portion of a metal layer in a storage capacitor region so that environmental light can be reflected. Therefore, the LCD panel 100a may be a micro-reflective LCD panel. Besides, the BM layer 320b may be fabricated using resin materials or metals.

The Second Embodiment

Figure 2A:
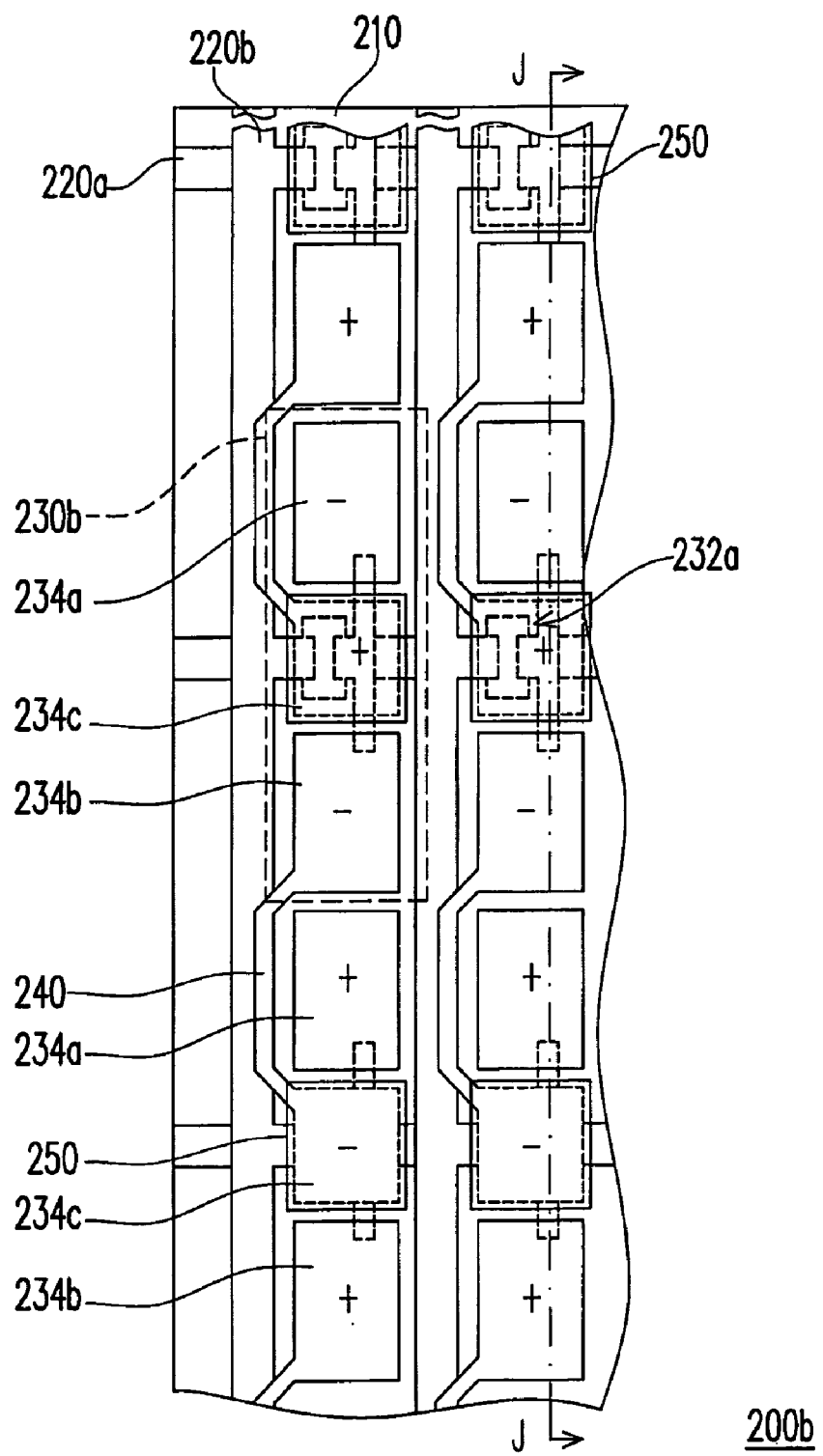
FIG. 2A illustrates a schematic top view of the active matrix substrate according to the second embodiment of the invention.
Figure 2B:
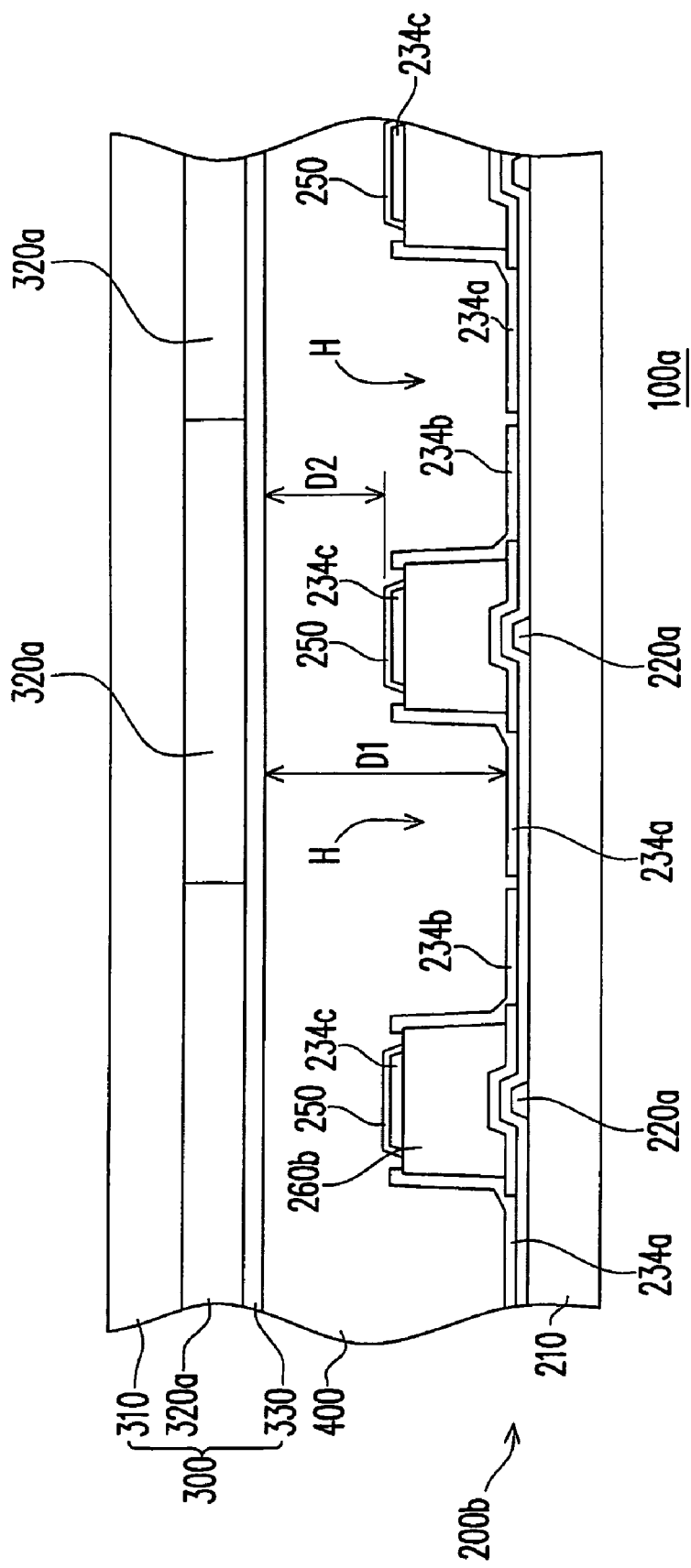
FIG. 2B illustrates a schematic cross-sectional view of the LCD panel according to the second embodiment of the invention.

FIG. 2A illustrates a schematic top view of the active matrix substrate according to the second embodiment of the invention. FIG. 2B illustrates a schematic cross-sectional view of the LCD panel according to the second embodiment of the invention, and an active matrix substrate 200b shown in FIG. 2B is a cross-sectional view obtained from FIG. 2A along line J-J. Referring to FIGS. 2A and 2B, the present embodiment is similar to the first embodiment except that an LCD panel 100b of the present embodiment is a transflective LCD panel. Specifically, in the LCD panel 100b of the present embodiment, the active matrix substrate 200b further includes a plurality of reflective layers 250. The reflective layers 250 are disposed on one of the third pixel electrodes 234c correspondingly to reflect light coming outside of the LCD panel 100b.

In order to meet the demands of different products, in each of the pixel units 230a, a total area of the first pixel electrode 234a and the second pixel electrode 234b may be equal or different from an area of the third pixel electrode 234c. If the total area of the first pixel electrode 234a and the second pixel electrode 234b is different from an area of the third pixel electrode 234c, the total area of the first pixel electrode 234a and the second pixel electrode 234b may be larger or smaller than an area of the third pixel electrode 234c.

In the embodiment, the LCD panel 100b may be a dual cell gap transflective LCD panel as shown in FIG. 2B. Specifically, since the portion of the first pixel electrodes 234a and the second pixel electrodes 234b on a planarization layer 260b of the active matrix substrate 200b is removed, the planarization layer 260b has a plurality of concaves H corresponding to the first pixel electrodes 234a and the second pixel electrodes 234b. The first pixel electrodes 234a and the second pixel electrodes 234b are located inside each of the concaves H respectively. Thus, in each of the pixel units 230b, a distance from the first pixel electrode 234a and the second pixel electrode 234b to the opposite substrate 300 is a first distance D1. A distance between the opposite substrate 300 and the third pixel electrode 234c is a second distance D2. The first distance D1 is different from the second distance D2. In one preferred embodiment, the first distance D1 is two times of the second distance D2.

The Third Embodiment

Figure 3A:
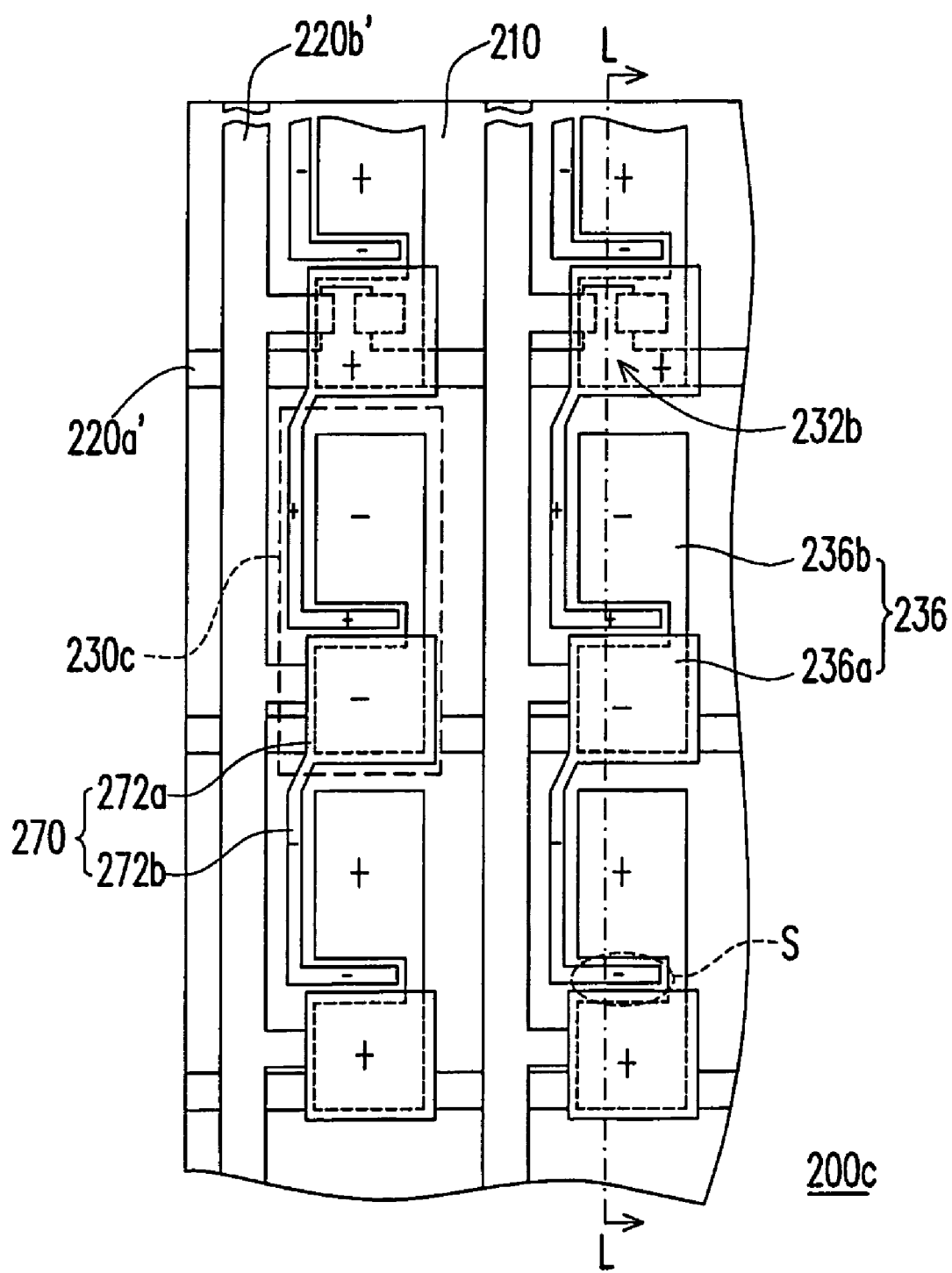
FIG. 3A illustrates a schematic top view of the active matrix substrate according to the third embodiment of the invention.
Figure 3B:
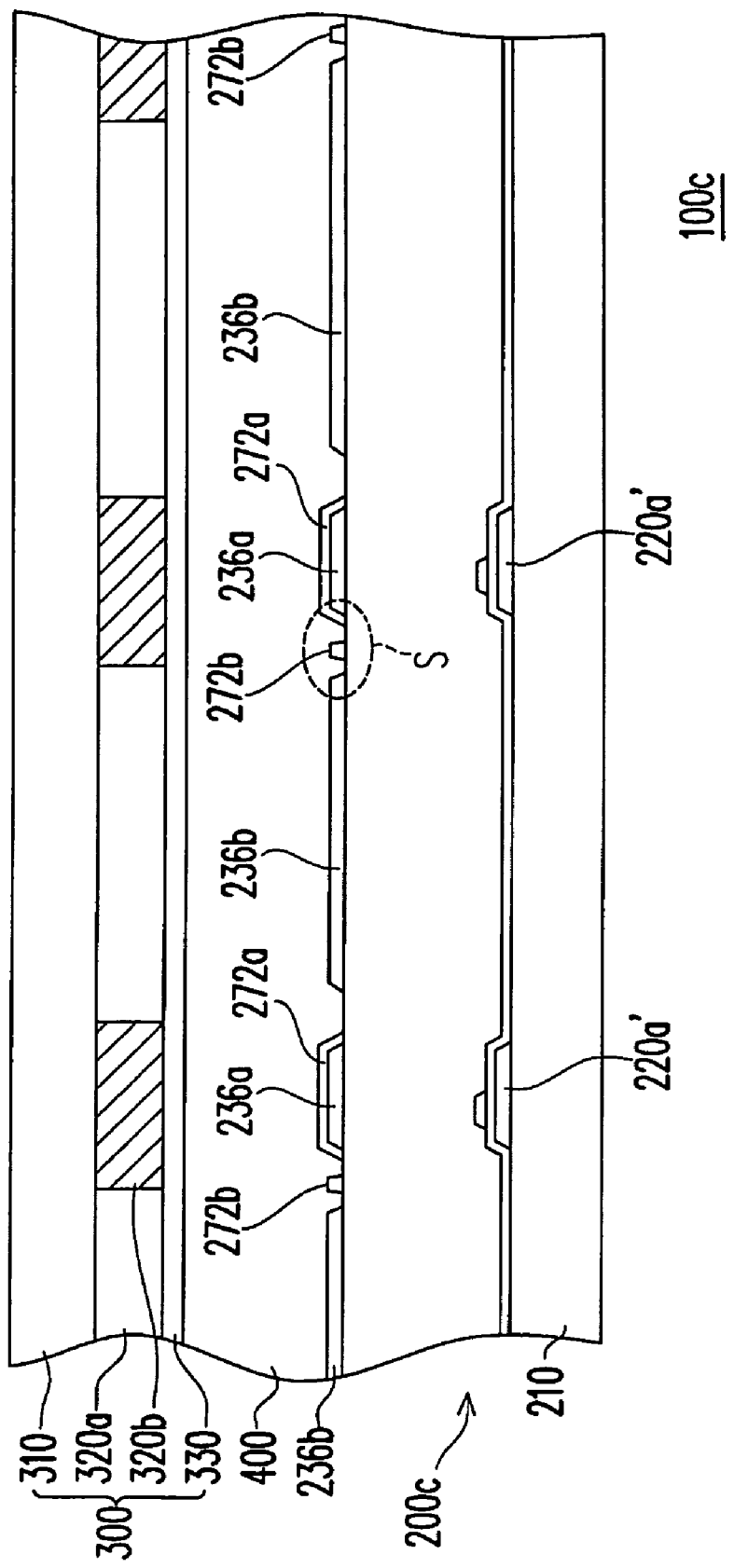
FIG. 3B illustrates a schematic cross-sectional view of the LCD panel of the third embodiment of the invention.

FIG. 3A illustrates a schematic top view of the active matrix substrate according to the third embodiment of the invention. FIG. 3B illustrates a schematic cross-sectional view of the LCD panel according to the third embodiment of the invention. FIG. 3B is a cross-sectional view of an active matrix substrate 200c obtained from FIG. 3A along line L-L. Referring to both FIGS. 3A and 3B, an LCD panel 100c includes an active matrix substrate 200c, an opposite substrate 300 and a liquid crystal layer 400. The opposite substrate 300 is located over the active matrix substrate 200c, and the liquid crystal layer 400 is disposed between the opposite substrate 300 and the active matrix substrate 200c.

The active matrix substrate 200c includes a substrate 210, a plurality of scan lines 220a', a plurality of data lines 220b', a plurality of pixel units 230c and a plurality of conductive patterns 270. The plurality of scan lines 220a' and data lines 220b' and the plurality of pixel units 230c and conductive patterns 270 are all disposed over the substrate 210. The pixel units 230c are electrically connected to the scan lines 220a' and the data lines 220b' correspondingly. Further, each of the pixel units 230c includes an active component 232b and a pixel electrode 236 electrically connected to the active component 232b.

The active component 232b is electrically connected to one of the scan lines 220a', one of the data lines 220b' and one of the pixel electrodes 236 correspondingly. The active component 232b is an A-Si TFT or a poly-silicon TFT, for example. The pixel electrode 236 has a first electrode portion 236a located over the active component 232b and a second electrode portion 236b electrically connected to the first electrode portion 236a. A slit S exists between the second electrode portion 236b and the first electrode portion 236a.

Each of the conductive patterns 270 has a body portion 272a and an extending portion 272b. In each pixel unit 230c, the body portion 272a is located on the first electrode portion 236a and electrically connected to the first electrode portion 236a. The extending portions 272b extend from the body portion 272a towards the direction of the pixel electrode 236 controlled by a next scan line 220a' into the slit S. Each of the second electrode portions 236b is located between two adjacent body portions 272a and between two adjacent extending portions 272b, as shown in FIG. 3A. Additionally, each of the conductive patterns 270 is electrically insulated from the pixel electrode 236 controlled by a next scan line 220a'.

Referring to FIG. 3A, the LCD panel 100c is driven in the same method as that of the aforementioned embodiment(s). The voltage polarity of the pixel electrode 236 is contrary to those of the pixel electrodes 236 controlled by a previous and a next scan lines 220a'. In each pixel unit 230c, the conductive patterns 270 and the pixel electrode 236 have the same voltage. Since the extending portion 272b of the conductive pattern 270 extends into the slit S of the pixel electrode 236 controlled by a next scan line 220a', the second electrode portion 236b of each of the pixel electrodes 236 is surrounded by the conductive pattern 270 having a contrary voltage polarity. For example, when the second electrode portion 236b has a positive voltage polarity, the surrounding conductive pattern 270 thereof has a negative voltage polarity, as shown in FIG. 3A. The first electrode portion 236a is surrounded by the conductive pattern 270 having a contrary voltage polarity and the second electrode portion 236b controlled by a next scan line 220a'. Consequently, the liquid crystal molecules in the same pixel unit 230c would form multiple domains over the first electrode portion 236a and the second electrode portion 236b. The problem of color shift is thus mitigated in the embodiment.

In the present embodiment, the plurality of body portions 272a and extending portions 272b of the conductive patterns 270 belong to the same layer of conductive patterns. Hence, the body portions 272a and the extending portions 272b of the conductive patterns 270 may be fabricated in the same thin film process. The plurality of first electrode portions 236a and second electrode portions 236b of the pixel electrodes 236 may belong to the same layer of electrode patterns. The first electrode portion 236a and the second electrode portion 236b may also be fabricated in the same thin film process. In view of the foregoing, not only the fabricating process is simplified in the embodiment, but the fabricating time is shortened.

The pixel electrode 236 is fabricated using transparent conductive materials, such as indium tin oxide (ITO), indium zinc oxide (IZO), or other transparent conductive oxide. The conductive pattern 270 can be fabricated using metallic materials and transparent conductive materials as well. Thus, the LCD panel 100c may be a transflective LCD panel or a transmissive LCD panel. Moreover, the pixel electrodes 236 and the conductive patterns 270 may belong to the same layer of transparent conductive patterns. Therefore, the pixel electrodes 236 and the conductive patterns 270 may be fabricated in the same thin film process.

In order to meet the requirements of different products, in each of the pixel electrodes 236, an area of the first electrode portion 236a may be equal or different from that of the second electrode portion 236b. If the area of the first electrode portion 236a is different from that of the second electrode portion 236b, the area of the first electrode portion 236a may be larger or smaller than that of the second electrode portion 236b.

In summary, the liquid crystal molecules in the same pixel unit form multiple domains on the pixel electrodes with different voltages in the present invention so that the LCD panel can have the characteristic of wide viewing angle. Furthermore, since the electric fields over the first pixel electrode, the second pixel electrode and the third pixel electrode are distributed differently, in each of the multiple domains, the relation between electric field distribution and luminance variation also differs accordingly. Hence, the problem of color shift is mitigated and the display quality is improved in the present invention. Additionally, no additional active component or conductive line is required for the active matrix substrate of the invention to mitigate the problem of color shift.

The invention thus possesses the advantages of a simple fabricating process and a low fabricating cost as compared with the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active matrix substrate, comprising:
a substrate;
a plurality of scan lines disposed on the substrate;
a plurality of data lines disposed on the substrate; and
a plurality of pixel units disposed on the substrate, wherein each of the pixel units comprises:
an active component electrically connected to one of the scan lines and one of the data lines correspondingly;
a first pixel electrode;
a second pixel electrode, wherein the first pixel electrode and the second pixel electrode are disposed respectively at the two opposite sides of one of the scan lines and electrically connected to the active component;
a third pixel electrode disposed over the active component and electrically insulated from the active component; and
a plurality of connecting lines disposed on the substrate, in the pixel units arranged in the same column, each of the third pixel electrodes electrically connected to the second pixel electrode controlled by a previous scan line through one of the connecting lines respectively, wherein each of the first pixel electrodes is surrounded by two connecting lines, a second pixel electrode and a third pixel electrode, and each of the third pixel electrodes is disposed between the second pixel electrode and the first pixel electrode.

2. The active matrix substrate of claim 1, wherein in the same pixel unit, a voltage polarity of the first pixel electrode is the same as a voltage polarity of the second pixel electrode, and a voltage polarity of the third pixel electrode is contrary to a voltage polarity of the first pixel electrode.

3. The active matrix substrate of claim 1, wherein the first pixel electrodes, the second pixel electrodes, the third pixel electrodes and the connecting lines belong to the same layer of electrode patterns.

4. The active matrix substrate of claim 1, wherein in each of the pixel units, a total area of the first pixel electrode and the second pixel electrode is substantially equal to an area of the third pixel electrode.

5. The active matrix substrate of claim 1, wherein in each of the pixel units, a total area of the first pixel electrode and the second pixel electrode is larger than an area of the third pixel electrode.

6. The active matrix substrate of claim 1, further comprising a plurality of reflective layers disposed on one of the third pixel electrodes.

7. The active matrix substrate of claim 6, wherein in each of the pixel units, a total area of the first pixel electrode and the second pixel electrode is different from an area of the third pixel electrode.

8. The active matrix substrate of claim 6, wherein in each of the pixel units, a total area of the first pixel electrode and the second pixel electrode is substantially equal to an area of the third pixel electrode.

9. The active matrix substrate of claim 1, wherein the active component comprises an amorphous silicon thin film transistor (a-Si TFT) or a poly-silicon TFT.

10. A liquid crystal display (LCD) panel, comprising:
an active matrix substrate, comprising:
a substrate;
a plurality of scan lines disposed on the substrate;
a plurality of data lines disposed on the substrate; and
a plurality of pixel units disposed on the substrate, wherein each of the pixel units comprises:
an active component electrically connected to one of the scan lines and one of the data lines correspondingly;
a first pixel electrode;
a second pixel electrode, wherein the first pixel electrode and the second pixel electrode are disposed respectively at the two opposite sides of one of the scan lines and electrically connected to the active component;
a third pixel electrode disposed over the active component and electrically insulated from the active component; and
a plurality of connecting lines disposed on the substrate, in the pixel units arranged in the same column, each of the third pixel electrodes electrically connected to the second pixel electrode controlled by a previous scan line through one of the connecting lines respectively, wherein each of the first pixel electrodes is surrounded by two connecting lines, a second pixel electrode and a third pixel electrode, and each of the third pixel electrodes is disposed between the second pixel electrode and the first pixel electrode;
an opposite substrate disposed over the active matrix substrate; and
a liquid crystal layer disposed between the active matrix substrate and the opposite substrate.

11. The LCD panel of claim 10, wherein in the same pixel unit, a voltage polarity of the first pixel electrode is the same as a voltage polarity of the second pixel electrode, and a voltage polarity of the third pixel electrode is contrary to the voltage polarity of the first pixel electrode.

12. The LCD panel of claim 10, wherein in each of the pixel units, the first pixel electrode, the second pixel electrode, the third pixel electrode and the connecting lines belong to the same layer of electrode patterns.

13. The LCD panel of claim 10, wherein in each of the pixel units, a total area of the first pixel electrode and the second pixel electrode is substantially equal to an area of the third pixel electrode.

14. The LCD panel of claim 10, wherein in each of the pixel units, the total area of the first pixel electrode and the second pixel electrode is larger than the area of the third pixel electrode.

15. The LCD panel of claim 10, further comprising a plurality of reflective layers disposed on the third pixel electrodes.

16. The LCD panel of claim 15, wherein in each of the pixel units, a total area of the first pixel electrode and the second pixel electrode is different from the area of the third pixel electrode.

17. The LCD panel of claim 15, wherein in each of the pixel units, a total area of the first pixel electrode and the second pixel electrode is substantially equal to the area of the third pixel electrode.

18. The LCD panel of claim 15, wherein in each of the pixel units, a distance from the opposite substrate to the first pixel electrode and the second pixel electrode is a first distance, a distance between the opposite substrate and the third pixel electrode is a second distance, and the first distance is two times of the second distance.

19. The LCD panel of claim 10, wherein the active component comprises an A-Si TFT or a poly-silicon TFT.

* * * * *